United States Patent
Kim et al.

(10) Patent No.: US 12,315,956 B2
(45) Date of Patent: *May 27, 2025

(54) BATTERY MODULE, BATTERY PACK COMPRISING SAME, AND VEHICLE

(71) Applicant: LG Energy Solution, Ltd., Seoul (KR)

(72) Inventors: Kyung-Mo Kim, Daejeon (KR); Eun-Gyu Shin, Daejeon (KR); Jae-Min Yoo, Daejeon (KR); Hyeon-Ki Yun, Daejeon (KR); Yoon-Koo Lee, Daejeon (KR); Eun-Ah Ju, Daejeon (KR); Jeong-O Mun, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 498 days.

This patent is subject to a terminal disclaimer.

(21) Appl. No.: 17/773,413

(22) PCT Filed: Nov. 11, 2020

(86) PCT No.: PCT/KR2020/095144
§ 371 (c)(1),
(2) Date: Apr. 29, 2022

(87) PCT Pub. No.: WO2021/112656
PCT Pub. Date: Jun. 10, 2021

(65) Prior Publication Data
US 2023/0025968 A1     Jan. 26, 2023

(30) Foreign Application Priority Data

Dec. 6, 2019  (KR) ..................... 10-2019-0161962

(51) Int. Cl.
*H01M 50/503*     (2021.01)

(52) U.S. Cl.
CPC ...... *H01M 50/503* (2021.01); *H01M 2220/20* (2013.01)

(58) Field of Classification Search
CPC .......... H01M 50/503; H01M 2220/20; H01M 10/482; H01M 50/209; H01M 50/249;
(Continued)

(56) References Cited

U.S. PATENT DOCUMENTS

2008/0076020 A1   3/2008  Wu
2013/0143452 A1   6/2013  Yoshikawa
(Continued)

FOREIGN PATENT DOCUMENTS

CN       102593395 A      7/2012
CN       103151634 A      6/2013
(Continued)

OTHER PUBLICATIONS

Search Report dated Aug. 16, 22 from Chinese Application No. 202011405152.1 issued Aug. 22, 2022. 3 pgs.
(Continued)

*Primary Examiner* — Daniel S Gatewood
(74) *Attorney, Agent, or Firm* — Lerner David LLP

(57) ABSTRACT

A battery module according to an embodiment of the present disclosure includes a plurality of battery cells and a bus bar assembly configured to electrically connect the electrode leads of the battery cells, and the bus bar assembly includes a bus bar frame configured to cover one side of the battery cells, a plurality of lead slots through which the electrode leads pass, a sensing bus bar connected to the electrode leads, and an elastic guider disposed at both left and right sides of the sensing bus bar in a left and right direction of the bus bar frame.

8 Claims, 6 Drawing Sheets

(58) Field of Classification Search
CPC ............. H01M 50/502; H01M 50/507; H01M 50/514; H01M 50/258; H01M 10/48; H01M 50/20; H01M 50/50; Y02E 60/10
See application file for complete search history.

(56) References Cited

U.S. PATENT DOCUMENTS

| | | | |
|---|---|---|---|
| 2019/0245186 | A1 | 8/2019 | Hong et al. |
| 2020/0020915 | A1* | 1/2020 | Chi ................... H01M 50/507 |
| 2020/0112014 | A1 | 4/2020 | Kim et al. |
| 2020/0350547 | A1 | 11/2020 | Chi et al. |
| 2020/0368855 | A1 | 11/2020 | Kim et al. |

FOREIGN PATENT DOCUMENTS

| | | |
|---|---|---|
| CN | 105895847 B | 5/2018 |
| CN | 110350136 A | 10/2019 |
| CN | 214153125 U | 9/2021 |
| EP | 3046164 A1 | 7/2016 |
| EP | 4030547 A1 | 7/2022 |
| JP | 200322795 A | 1/2003 |
| JP | 2014160679 A | 9/2014 |
| KR | 20140093424 A | 7/2014 |
| KR | 20190040759 A * | 10/2017 |
| KR | 20180136803 A | 12/2018 |
| KR | 20190040402 A | 4/2019 |
| KR | 20190073933 A | 6/2019 |
| KR | 20190107396 A | 9/2019 |

OTHER PUBLICATIONS

Search report from International Application No. PCT/KR2020/095144, mailed Feb. 25, 2021.

Extended European Search Report including Written Opinion for Application No. 20896896.6 dated Sep. 16, 2024. 7 pgs.

* cited by examiner

BATTERY MODULE, BATTERY PACK COMPRISING SAME, AND VEHICLE

CROSS REFERENCE TO RELATED APPLICATIONS

The present application is a national phase entry under 35 U.S.C. § 371 of International Application PCT/KR2020/095144 filed on Nov. 11, 2020 which claims priority to Korean Patent Application No. 10-2019-0161962 filed on Dec. 6, 2019 in the Republic of Korea, the disclosures of which are incorporated herein by reference.

TECHNICAL FIELD

The present disclosure relates to a battery module, a battery pack and a vehicle including the battery module.

BACKGROUND ART

Secondary batteries, which are highly applicable to various products and exhibit superior electrical properties such as high energy density, etc., are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may vary according to the required output voltage or the required charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

In the case of a conventional battery module, an electrode lead of a battery cell and a sensing bus bar of a bus bar assembly are closely pressed using a welding jig, and the electrode lead and the sensing bus bar are welded by laser welding or the like. When the electrode lead of the conventional battery cell and the sensing bus bar of the bus bar assembly are welded, problems such as misalignment between the electrode lead and the sensing bus bar may occur due to the assembly tolerance of the bus bar assembly. In the conventional battery module, if the welding process is performed while the electrode lead and the sensing bus bare are misaligned, welding defects may occur more frequently.

In order to correct the misalignment of the conventional art, the electrode lead and the sensing bus bar may be pressed using a pressing jig or the like. However, in the case of a conventional battery module, generally, the sensing bus bar is mounted in a state of being fixed to the bus bar frame of the bus bar assembly, so the relatively flexible electrode lead is intensively pressed, thereby damaging the electrode lead.

Therefore, it is desired to find a way to provide a battery module which may prevent the electrode lead from being damaged while connecting the electrode lead of at least one battery cell and the sensing bus bar of the bus bar assembly, and prevent welding quality from being degraded even if misalignment occurs due to assembly tolerance or the like, and a battery pack and a vehicle including the battery module.

DISCLOSURE

Technical Problem

Therefore, the present disclosure is directed to providing a battery module, which may prevent an electrode lead from being damaged while connecting the electrode lead of at least one battery cell and a sensing bus bar of a bus bar assembly, and a battery pack and a vehicle including the battery module.

In addition, the present disclosure is also directed to providing a battery module which may prevent welding quality from being degraded even if misalignment occurs due to assembly tolerance or the like when the electrode lead of at least one battery cell and the sensing bus bar of the bus bar assembly are connected by welding, and a battery pack and a vehicle including the battery module.

Moreover, the present disclosure is also directed to providing a battery module which may prevent the electrode lead from being damaged at cell swelling of battery cells, and a battery pack and a vehicle including the battery module.

Technical Solution

In one aspect of the present disclosure, there is provided a battery module, comprising: a plurality of battery cells having electrode leads protruding on at least one side thereof; and a bus bar assembly configured to electrically connect the electrode leads of the plurality of battery cells, wherein the bus bar assembly includes a bus bar frame configured to cover at least one side of the plurality of battery cells; a plurality of lead slots defined by the bus bar frame so that the electrode leads pass therethrough; at least one sensing bus bar disposed between the plurality of lead slots and connected to the electrode leads; and at least one elastic guider configured to elastically support the at least one sensing bus bar and disposed at both left and right sides of the at least one sensing bus bar in a left and right direction of the bus bar frame.

The at least one sensing bus bar may be configured to be movable along a left and right direction of the bus bar frame while elastically contacting the at least one elastic guider.

The at least one elastic guider may include an upper leaf spring provided to the bus bar frame and configured to be elastically deformable in a left and right direction of the bus bar frame; and a lower leaf spring provided to the bus bar frame to be spaced apart from the upper leaf spring by a predetermined distance in an upper and lower direction of the bus bar frame and configured to be elastically deformable in a left and right direction of the bus bar frame.

The upper leaf spring may be provided in a pair, and the pair of upper leaf springs may be disposed to face each other with the at least one sensing bus bar being interposed therebetween.

The lower leaf spring may be provided in a pair, and the pair of lower leaf springs may be disposed to face each other with the at least one sensing bus bar being interposed therebetween.

The at least one elastic guider may be formed integrally with the bus bar frame.

The bus bar assembly may include an anti-separation stopper coupled to the bus bar frame to prevent the at least one sensing bus bar from being separated forward at the front of the at least one sensing bus bar.

The anti-separation stopper may include a pair of stopper hooks provided to upper and lower sides of the at least one sensing bus bar to restrict movement of upper and lower ends of the at least one sensing bus bar over a predetermined distance when the at least one sensing bus bar moves forward.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may prevent an electrode lead from being damaged while connecting the electrode lead of at least one battery cell and a sensing bus bar of a bus bar assembly, and a battery pack and a vehicle including the battery module.

In addition, according to various embodiments as above, it is possible to provide a battery module, which may prevent welding quality from being degraded even if misalignment occurs due to assembly tolerance or the like when the electrode lead of at least one battery cell and the sensing bus bar of the bus bar assembly are connected by welding, and a battery pack and a vehicle including the battery module.

Moreover, according to various embodiments as above, it is possible to provide a battery module, which may prevent the electrode lead from being damaged at cell swelling of battery cells, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
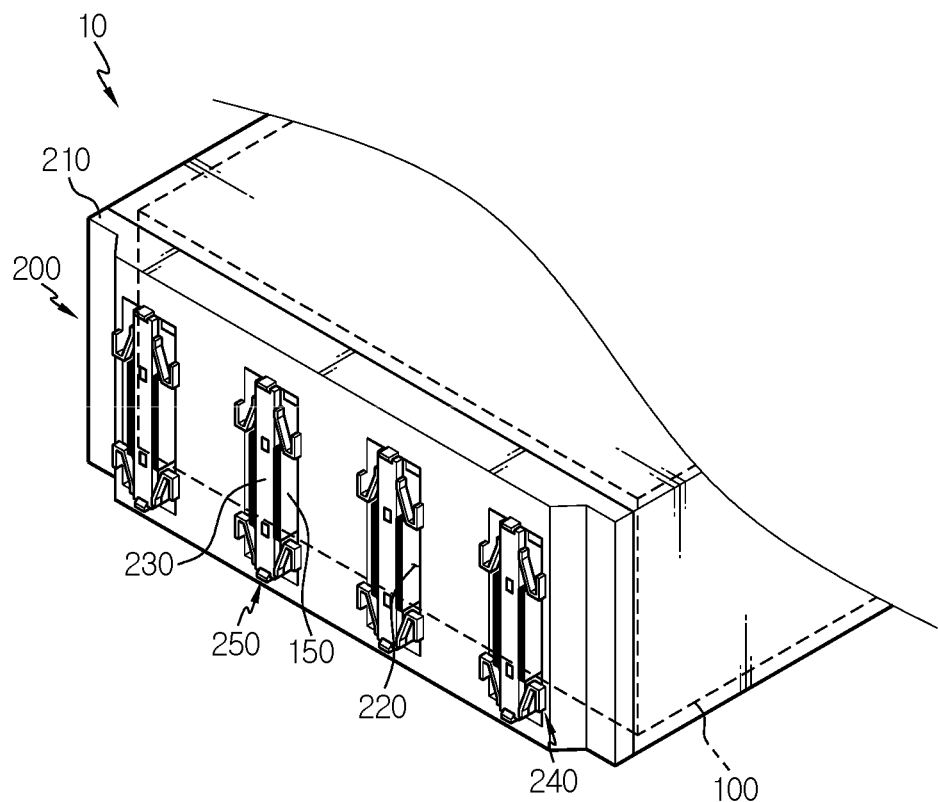
FIG. 1 is a perspective view for illustrating a battery module according to an embodiment of the present disclosure.
Figure 2:
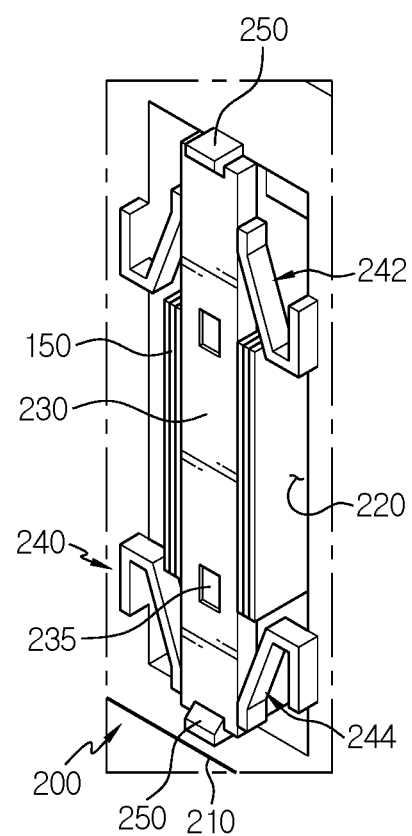
FIG. 2 is a diagram for illustrating main parts of the battery module of FIG. 1.
Figure 3:
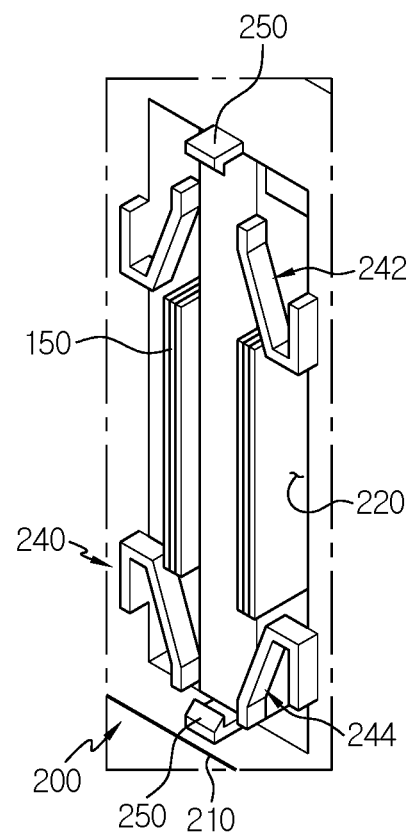
FIG. 3 is a diagram for illustrating a bus bar frame, from which a sensing bus bar of a bus bar assembly of FIG. 2 is excluded.
Figure 4:
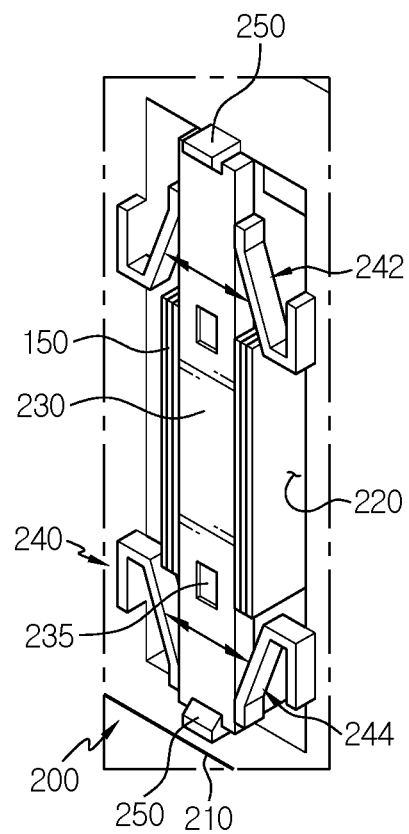
FIGS. 4 and 5 are diagrams for illustrating left and right movement of the sensing bus bar through an elastic guider of the battery module of FIG. 1.
Figure 5:
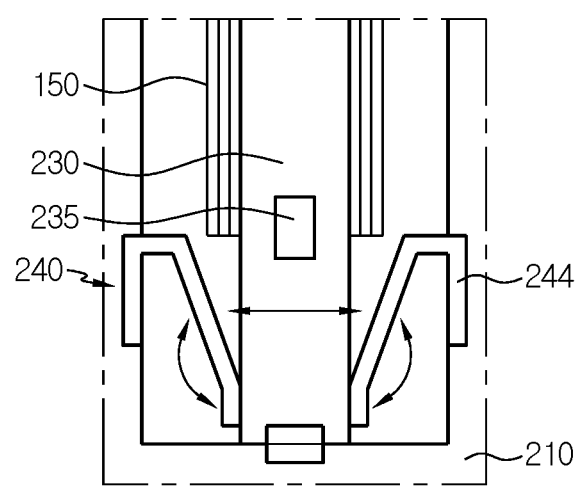

FIG. 1 is a perspective view for illustrating a battery module according to an embodiment of the present disclosure, FIG. 2 is a diagram for illustrating main parts of the battery module of FIG. 1, FIG. 3 is a diagram for illustrating a bus bar frame, from which a sensing bus bar of a bus bar assembly of FIG. 2 is excluded, and FIGS. 4 and 5 are diagrams for illustrating left and right movement of the sensing bus bar through an elastic guider of the battery module of FIG. 1.

Referring to FIGS. 1 to 5, a battery module 10 may include a battery cell 100 and a bus bar assembly 200.

The battery cell 100 is a secondary battery, and may be provided as a pouch-type secondary battery, a rectangular secondary battery or a cylindrical secondary battery. Hereinafter, in this embodiment, it will be described that the battery cell 100 is a pouch-type secondary battery.

The battery cell 100 may be provided in plural. The plurality of battery cells 100 are stacked on each other to be electrically connected to each other, and electrode leads 150 may protrude on at least one side thereof.

The bus bar assembly 200 is for electrically connecting electrode leads 150 of the plurality of battery cells 100, and may be disposed at one side of the plurality of battery cells 100.

The bus bar assembly 200 may include a bus bar frame 210, a lead slot 220, a sensing bus bar 230, an elastic guider 240, and an anti-separation stopper 250.

The bus bar frame 210 may cover at least one side of the plurality of battery cells 100. To this end, the bus bar frame 210 may have a size and shape capable of covering at least one side of the plurality of battery cells 100.

The lead slot 220 is defined by or formed within the bus bar frame 210 and may allow the electrode leads 100 of the plurality of battery cells 100 to pass therethrough. The lead slot 220 may be provided in plural.

The sensing bus bar 230 is disposed between the plurality of lead slots 220 and may be connected to the electrode leads 150 of the battery cells 100. At least one sensing bus bar 230 or a plurality of sensing bus bars 230 may be provided. Hereinafter, in this embodiment, it will be described that the sensing bus bar 230 is provided in plural.

The plurality of sensing bus bars 230 may be connected with the electrode leads 150 of the plurality of battery cells 100 passing through the lead slots 220 by welding such as laser welding. Here, the electrode leads 150 may be welded to the sensing bus bar 230 without bending.

The plurality of sensing bus bars 230 may be provided to be movable along a left and right direction of the bus bar frame 210 while elastically contacting the elastic guider 240, as explained below in greater detail.

The plurality of sensing bus bars 230 may have at least one guide groove 235.

The at least one guide groove 235 may be inserted into a device such as a mounting jig during the assembly process of the sensing bus bar 230 to guide mounting of the sensing bus bar 230.

The at least one guide groove 235 may be provided in plural. The plurality of guide grooves 235 may be disposed to be spaced apart from each other by a predetermined distance along a longitudinal direction of the sensing bus bar 230.

The elastic guider 240 may elastically support the sensing bus bar 230, and may be disposed at both left and right sides of the at least one sensing bus bar 230 in a left and right direction of the bus bar frame 210.

The elastic guider 240 may be provided in plural. The plurality of elastic guiders 240 may be formed integrally with the bus bar frame 210. The plurality of elastic guiders 240 may include an upper leaf spring 242 and a lower leaf spring 244.

The upper leaf spring 242 may be coupled to the bus bar frame 210 and may be configured to be elastically deformable in a left and right direction of the bus bar frame 210. The upper leaf spring 242 may be provided in a pair. The pair of upper leaf springs 242 may be disposed to face each other with the at least one sensing bus bar 230 being interposed therebetween.

The lower leaf spring 244 may be provided to the bus bar frame 210 to be spaced apart from the upper leaf spring 242 by a predetermined distance in an upper and lower direction of the bus bar frame 210, and may be configured to be elastically deformable in a left and right direction of the bus bar frame 210.

The lower leaf spring 244 may be provided in a pair. The pair of lower leaf springs 244 may be disposed to face each other with the at least one sensing bus bar 230 being interposed therebetween.

The anti-separation stopper 250 is coupled to the bus bar frame 210, and when the sensing bus bar 230 moves back and forth in the left and right directions between the elastic guider 240 at the front of the sensing bus bar 230, the anti-separation stopper 250 may prevent the sensing bus bar 230 from being separated forward, i.e., in a direction away from the bus bar frame 210.

The anti-separation stopper 250 may include a pair of stopper hooks 250 provided at upper and lower sides of the at least one sensing bus bar 230 to restrict upper and lower ends of the at least one sensing bus bar 230 from moving forward.

In the battery module 10 according to this embodiment, during the assembly process of the battery cells 100 and the bus bar assembly 200, problems such as misalignment may occur between the electrode leads 150 of the battery cells 100 and the sensing bus bar 230 of the bus bar assembly 200 due to assembly tolerance or the like. In particular, problems such as misalignment may frequently occur in a left and right direction of the electrode leads 150 of the battery cells 100 and the sensing bus bar 230 of the bus bar assembly 200.

In this embodiment, even after the sensing bus bar 230 is placed on the bus bar frame 210, the sensing bus bar 230 is guided through the elastic guider 240 to move in a left and right direction. So a worker or the like may fix the electrode leads 150 and the sensing bus bar 230 by welding or the like after correcting the misalignment.

In addition, in this embodiment, even if a problem such as misalignment occurs between the electrode leads 150 and the sensing bus bar 230, the welding process may be carried out after moving the sensing bus bar 230, which is movable left and right, to the correct position, so it is possible to prevent welding defects caused by misalignment in advance.

Moreover, when correcting the misalignment, the elastic guider 240 may elastically support the sensing bus bar 230 moving in a left and right direction, so it is possible to significantly reduce damage to the electrode lead 150 that may occur when the position of the sensing bus bar 230 is adjusted.

Further, in this embodiment, in the battery module 10, the battery cells 100 may be inflated in a thickness direction due to an abnormal situation such as overheating of the battery cells 100. That is, the battery cells 100 may be inflated in a left and right direction due to cell swelling.

In this embodiment, during cell swelling of the battery cells 100, by means of the elastic guider 240, the sensing bus bar 230 and ends of the electrode leads 150 welded to the sensing bus bar 230 may be elastically moved in a left and right direction.

As the sensing bus bar 230 and the ends of the electrode leads 150 welded to the sensing bus bar 230 move in a left and right direction, it is possible to compensate for the length of the electrode leads 150 that tend to be stretched due to the cell swelling of the battery cells 100.

Therefore, the battery module 10 according to this embodiment may effectively prevent damage to the electrode leads 150 caused by a tensile stress by minimizing the tensile stress applied to the electrode leads 150 during cell swelling of the battery cells 100.

Figure 6:
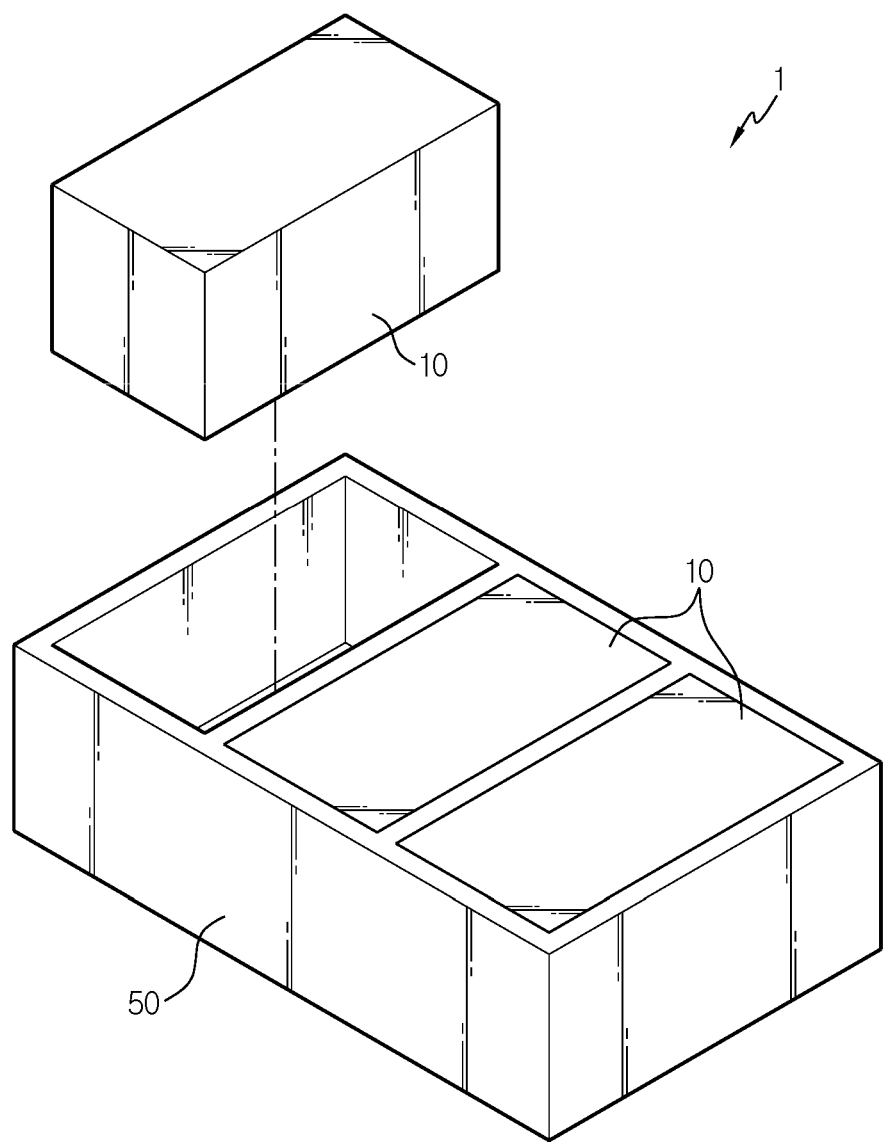
FIG. 6 is a diagram for illustrating a battery pack according to an embodiment of the present disclosure.
Figure 7:
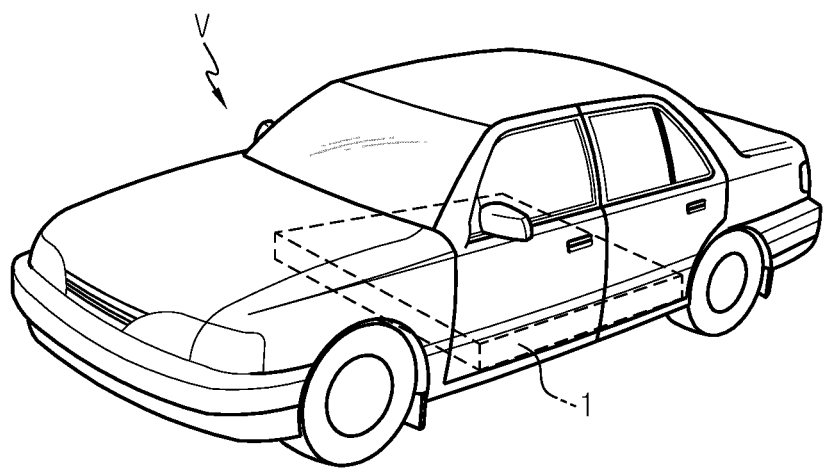
FIG. 7 is a diagram for illustrating a vehicle according to an embodiment of the present disclosure.

FIG. 6 is a diagram for illustrating a battery pack according to an embodiment of the present disclosure, and FIG. 7 is a diagram for illustrating a vehicle according to an embodiment of the present disclosure.

Referring to FIGS. 6 and 7, a battery pack 1 may include at least one battery module 10 according to the former embodiment and a pack case 50 for packaging the at least one battery module 10.

The battery pack 1 may be provided to a vehicle as a fuel source of a vehicle V. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

According to various embodiments as above, it is possible to provide a battery module 10, which may prevent an electrode lead 150 from being damaged while connecting the electrode lead 150 of at least one battery cell 100 and a sensing bus bar 230 of a bus bar assembly 200, and a battery pack 1 and a vehicle V including the battery module 10.

As described according to various embodiments as above, it is therefore possible to provide a battery module 10 which may prevent welding quality from being degraded even if misalignment occurs due to assembly tolerance or the like when the electrode lead 150 of at least one battery cell 100 and the sensing bus bar 230 of the bus bar assembly 200 are connected by welding, and a battery pack 1 and a vehicle V including the battery module.

Moreover, according to various embodiments as described above, it is possible to provide a battery module 10 which may prevent the electrode lead 150 from being damaged at cell swelling of battery cells 100, and a battery pack 1 and a vehicle V including the battery module.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells having electrode leads protruding on at least one side of each of the plurality of battery cells; and
   a bus bar assembly configured to electrically connect the electrode leads of the plurality of battery cells,
   wherein the bus bar assembly includes:
   a bus bar frame configured to cover at least one side of each of the plurality of battery cells;
   a plurality of lead slots defined by the bus bar frame size and shaped for the electrode leads to pass therethrough;
   at least one sensing bus bar disposed within each of the plurality of lead slots and connected to the electrode leads; and
   at least one elastic guider configured to elastically support the at least one sensing bus bar and disposed at first and second opposing sides of the at least one sensing bus bar in first and second directions of the bus bar frame,
   wherein the at least one sensing bus bar is configured to be movable along first and second directions of the bus bar frame while contacting the at least one elastic guider, and
   wherein the at least one elastic guider includes:
   an upper leaf spring coupled to the bus bar frame and configured to be elastically deformable in first and second directions of the bus bar frame; and
   a lower leaf spring coupled to the bus bar frame to be spaced apart from the upper leaf spring by a predetermined distance in third and fourth directions of the bus bar frame and configured to be elastically deformable in the first and second directions of the bus bar frame.

2. The battery module according to claim 1, wherein the upper leaf spring is provided in a pair, and the pair of upper leaf springs are disposed to face each other with the at least one sensing bus bar being interposed therebetween.

3. The battery module according to claim 1, wherein the lower leaf spring is provided in a pair, and the pair of lower leaf springs are disposed to face each other with the at least one sensing bus bar being interposed therebetween.

4. The battery module according to claim 1, wherein the at least one elastic guider is formed integrally with the bus bar frame.

5. The battery module according to claim 1, wherein the bus bar assembly includes an anti-separation stopper coupled to the bus bar frame to prevent the at least one sensing bus bar from being separated from the at least one sensing bus bar frame.

6. The battery module according to claim 5, wherein the anti-separation stopper includes a pair of stopper hooks coupled to the at least one sensing bus bar to restrict opposing ends of the at least one sensing bus bar from moving forward.

7. A battery pack, comprising:
   at least one battery module as defined in claim 1; and
   a pack case configured to package the at least one battery module.

8. A vehicle, comprising at least one battery pack as defined in claim 7.

* * * * *